United States Patent [19]

Morenz et al.

[11] Patent Number: 5,112,663
[45] Date of Patent: May 12, 1992

[54] METHOD OF MANUFACTURING COMPOSITE STRUCTURES

[75] Inventors: Paul W. Morenz, Rancho Santa Fe; Charles E. Knox, Carlsbad, both of Calif.

[73] Assignee: General Dynamics Corporation, Convair Division, San Diego, Calif.

[21] Appl. No.: 689,202

[22] Filed: Apr. 22, 1991

[51] Int. Cl.⁵ .............................................. B32B 3/26
[52] U.S. Cl. ...................................... 428/71; 156/213; 156/295; 156/313; 264/321; 428/159; 428/160; 428/314.4; 428/314.8; 428/316.6; 428/322.7
[58] Field of Search ............... 428/322.7, 316.6, 314.8, 428/314.4, 160, 159, 71; 156/213, 295, 313; 264/321

[56] References Cited

U.S. PATENT DOCUMENTS

| | | | |
|---|---|---|---|
| 3,930,919 | 1/1976 | Chant et al. | 428/322.7 |
| 3,944,704 | 3/1976 | Dirks | 428/322.7 |
| 3,989,781 | 11/1976 | Chant | 428/322.7 |
| 4,028,477 | 6/1977 | Goppel et al. | 428/322.7 |
| 4,034,137 | 7/1977 | Hofer | 428/322.7 |
| 4,042,746 | 8/1977 | Hofer | 428/322.7 |

Primary Examiner—William J. Van Balen
Attorney, Agent, or Firm—John R. Duncan; George T. Parsons

[57] ABSTRACT

A method of making a composite structure, such as an aircraft wing, which has a foam core and at least one outer layer of fiber reinforced resin material. A shaped foam core is prepared by compressing a rigid, closed-cell foam to the desired shape in a closed mold under heat and pressure. A sheet of flexible open-cell foam is impregnated with a thermosetting resin. A sheet of dry fiber reinforcement material is placed on one or both sides of the impregnated foam sheet. The resulting sandwich is wrapped around the foam core and the assembly is placed in a corresponding tool cavity. The tool is heated to the curing temperature of the impregnating resin. As the temperature rises, the foam core expands, exerting pressure on the impregnated foam sheet, forcing resin into the fiber reinforcement, wetting all the fibers and forcing air out of the material. As the resin cures, void-free, strong skins are formed integral with the core foam. After the resin is cured, the part is cooled, removed from the tool and trimmed.

9 Claims, 1 Drawing Sheet

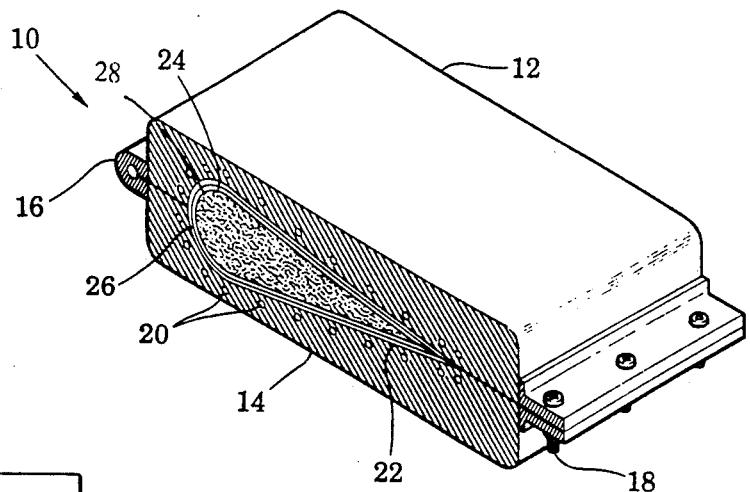

FIG. 1

```
┌─────────────────────┐
│ PROVIDE A SHEET OF  │
│ OPEN-CELL FLEXIBLE  │─50
│       FOAM          │
└──────────┬──────────┘
           ▼
┌─────────────────────┐         ┌─────────────────────┐
│   IMPREGNATE WITH   │         │  PREPARE OVERSIZE   │─30
│ LIQUID THERMOSETTING│─60      │  CLOSED-CELL FOAM   │
│       RESIN         │         │        CORE         │
└──────────┬──────────┘         └──────────┬──────────┘
           ▼                               ▼
┌─────────────────────┐         ┌─────────────────────┐
│    PLACE DRY FIBER  │─70      │ COMPRESS TO DESIRED │─40
│    SHEET ON FOAM    │         │        SHAPE        │
└──────────┬──────────┘         └──────────┬──────────┘
           └───────────────┬───────────────┘
                           ▼
              ┌─────────────────────┐
              │  PLACE FIBER/FOAM   │─80
              │    SHEET ON CORE    │
              └──────────┬──────────┘
                         ▼
              ┌─────────────────────┐
              │   PLACE IN HEATED   │─90
              │   CLOSED TOOLING    │
              └──────────┬──────────┘
                         ▼
              ┌─────────────────────┐
              │ SQUEEZED RESIN FROM │─100
              │ OPEN CELL FOAM INTO │
              │  FIBERS, CURE RESIN │
              └─────────────────────┘
```

FIG. 2

METHOD OF MANUFACTURING COMPOSITE STRUCTURES

BACKGROUND OF THE INVENTION

This invention relates in general to composite structures and, more specifically, to the manufacture of composite structures having a foam core and one or more reinforcing layers of high strength fibers embedded in a thermosetting resin matrix.

Structures in which high strength fibers are embedded in a synthetic resin matrix have come into widespread use due to the high strength to weight ratio of such materials and the general ease of forming complex structures. Originally, fibers such as glass fibers were impregnated with a thermosetting resin such as a polyester and laid up by hand over male molds. While suitable for many products, these methods are labor intensive, do not produce high precision structures and tend to have less than optimum strength and weight, due to bubbles or other voids in the product and uneven resin distribution.

Where higher quality and higher strength is required, higher performance fiber such as graphite and boron fibers, and methods of applying pressure to the shaped structure during resin cure have been developed. For simple structures, hand layup of resin impregnated sheets followed by autoclaving at high temperature and pressure or the application of pressure in a press or with vacuum bag at elevated temperatures often produce excellent products. However, these methods all require complex, expensive and slow equipment, considerable hand work and are not very suitable for complex structures.

For more complex shapes such as channels, wing boxes, missile fins and the like, a variety of complex, multi-component tooling has been developed to apply pressure at appropriate places across a hand laid-up preform during high temperature curing. Attempts have been made to use elastomers having positive coefficients of thermal expansion as the pressure application means, as described by Prunty in U.S. Pat. No. 4,388,263 and Arachi in U.S. Pat. No. 4,167,430. While effective where carefully designed for specific parts, these systems are complex, expensive to design and use and may require frequent replacement of the elastomeric pads which change expansion characteristics after a number of high temperature cycles.

Thus there is a continuing need for improved methods of producing high quality, void-free, uniformly impregnated, composite structures at lower cost.

SUMMARY OF THE INVENTION

It is, therefore, an object of this invention to provide a method of fabricating composite structures which overcomes the above-noted problems. Another object is to provide a composite fabrication method of improved simplicity and low cost, which uses simple low cost tooling. Another object is to provide an improved method of fabricating an improved composite structure having a fiber reinforced resin skin on a foam core.

The above objects, and others, are accomplished in accordance with this invention by a process that basically comprises the steps of impregnating a sheet of open-cell flexible foam material with a thermosetting resin, preparing a shaped foam core by compressing a rigid closed-cell foam preform to a desired shape in a closed mold under heat and pressure, placing a dry fiber reinforcement sheet on one or both sides of the impregnated foam sheet, wrapping this assembly around the core, placing this final assembly in a conforming mold and heating to cure the thermosetting resin. As temperature rises, the closed cell foam core expands, exerting pressure on the foam sheet. The foam sheet carrying the resin is compressed, forcing the resin into the fiber reinforcement, wetting all the fibers and forcing air out of the fiber material to produce void-free, strong skins integral with the core. After the resin is cured, the part is cooled, removed from the tool and trimmed.

BRIEF DESCRIPTION OF THE DRAWING

Details of the invention, and of a preferred embodiment thereof, will be further understood upon reference to the drawing, wherein:

FIG. 1 is a schematic cross-section view through tooling for forming and curing the product; and FIG. 2 is a block diagram illustrating the process of this invention.

DETAILED DESCRIPTION OF PREFERRED EMBODIMENTS

Referring now to FIG. 1, there is seen a schematic vertial cross-section through a mold 10 suitable for containing the product components during shaping and resin cure. The mold shown includes an upper half 12 and a lower half 14 hingedly connected at 16 and secured in the closed position by bolts 18. This simple mold can easily be opened for installation of the materials to be shaped and bonded and for product removal after processing. Heating elements 20 are provided to provide suitable heating to cure the thermosetting resin.

Any suitable mold may be used which provides a closed shaping and curing cavity and means for heating the cavity. A suitable mold release coating or film may be provided on the cavity to avoid sticking of the product to the cavity. Heating elements may be any suitable heating means, such as electrical heating elements, channels for steam heat, etc.

The preform 22 is prepared as described below, and includes a compressed closed-cell foam core 24, a sheet of open cell foam 26 which acts to carry the matrix resin and an initially dry fiber sheet 28 which forms a structural surface skin on the product. If desired, a second dry fiber sheet 28 may be used between foam core 24 and open-cell foam sheet 26.

The process steps in forming the improved composite product are schematically indicated in the block diagram of FIG. 2. Initially a closed cell foam core 24 having the desired shape but somewhat oversize is prepared, as indicated in block 30. Any suitable closed cell foam may be used which is not subject to degradation by the liquid thermosetting resin detailed below. Typical closed-cell foam materials include polystyrene, polyurethane and polymethacrylimide based foams. The initial core then is compressed, preferably in a closed mold under heat and pressure, to the desired configuration, as indicated in block 40. Typically, the initial core may be compressed to a volume of from about 75 to 95% of the original thickness. For best results, the reduction in volume should be to about 80–85% of the original volume.

Meanwhile, a sheet of flexible, open-cell foam 26 is provided, as indicated in block 50. Any flexible, open-cell foam material which is not degraded by the thermosetting resin described below may be used. Typical such foams include those based on polyurethane or other physically similar systems. The foam sheet 26 may have any suitable thickness. The thickness should be sufficient to carry sufficient liquid thermosetting resin precursor to fully wet the fiber facing or facings, as described below. Typically, the open-cell foam sheet will have thicknesses in the 0.125 to 1.0 inch range.

The open cell foam sheet 26 is then impregnated with a liquid thermosetting resin as indicated in block 60. Any suitable thermosetting resin may be used. Typical thermosetting resins include epoxy, polyester, vinyl ester, bismaleimide resins and mixtures thereof. Of these, epoxy resins are preferred because they have excellent properties and are commonly used in aerospace applications, with well understood physical characteristics.

A dry sheet of fiber reinforcement material 28 is then placed on one or both sides of the resin impregnated foam sheet 26, as indicated in block 70. If desired, multiple layers of impregnated foam and dry fiber reiforcement may be used, although a single foam sheet with one or two fiber face sheets is preferred for simplicity and light weight. The dry fiber sheets may be in woven, matt or any other suitable form and may have any desired thickness. Typical fibers include glass, graphite, boron, aramid and mixtures thereof.

The preform assembly of resin impregnated foam 26 with one or two dry fiber face sheets 28 is then placed on or wrapped around foam core 2, as indicated in block 80. The resulting assembly is placed in a closed mold as indicated in block 90. The mold is heated, causing the closed cell foam core 24 to expand, which compresses open-cell foam sheet 26 and squeeze resin from sheet 26 into the fiber sheet 28 as indicated in block 100. The thickness of foam sheet 26 is selected so that it will carry sufficient liquid resin precursor to fully impregnate fiber sheet 28. As heating of the mold continues, the resin is fully cured to the final state. The pressure created by expanding core 24 also causes the fiber sheet to closely and uniformly press against the inside surface of the mold to produce a product having the precise dimensions of the mold surface and a very smooth finish.

Details of preferred methods according to this invention will be further understood upon reference to the following examples. Parts and percentages are by weight, unless otherwise indicated.

EXAMPLE I

A block of rigid, closed-cell polystyrene foam, available from Dow Plastics, is carved to an airfoil shape, forming a foam core. The core is placed in a closed mold which compresses the core to about 80% of the original volume. The mold is heated to about 170° F. for about 5 minutes, then cooled and the compressed core is removed. A sheet of 0.5 inch thick open-cell flexible polyurethane foam available from Scott Foam Co. under the Scott Industrial Foam designation, is soaked in a quantity of liquid epoxy resin from Shell Chemical Co. for a period sufficient to substantially fill all interstices. A sheet made up of 5 layers of dry glass fiber fabric, from the Clark-Schwebel Fiber Glass Co., having a thickness of about 0.25 inch is placed on one side of the impregnated foam sheet and the assembly is wrapped around the compressed core, with the fiber sheet on the outside. The resulting preform assembly is placed in a closed airfoil shaped mold in which the preform fits fairly tightly. The mold is heated to about 190° F. for about 2 hours, during which period the foam core expands, compressing the foam sheet and forcing resin into the fiber layer. Then the temperature is increased to about 235° F. for about 2 hours to fully cure the resin. The mold is cooled and the product is removed. Upon examination, a well bonded assembly having a uniform, substantially void free fiber reinforced surface is observed.

EXAMPLE II

A block of rigid, closed cell polymethacrylimide foam, available from CYRO Industries under the designation Rohacell, is carved to an airfoil shape, forming a foam core. The core is placed into a heated closed mold which compresses the core to about 75% of the original volume. The mold is heated to about 210° F. for about 15 minutes, then is cooled and the compressed core is removed. An 0.5 inch thick sheet of open cell Scott Industrial Foarm polyurethane foam, from Scott Foam, is impregnated with a quantity of liquid epoxy resin from the Shell Chemical Co. to substantially fill the foam. Three layers of graphic fiber fabric sheets from ICI Fiberite are placed on one side of the impregnated foam sheet and the assembly of sheets is wrapped around the compressed core with the fiber sheets on the outside. The resulting preform assembly is placed in a matched airfoil shaped mold in which the preform fits fairly tightly. The mold is heated to about 230° F. for about 2 hours, during which period the foam core expands, compressing the impregnated foam sheet and forcing resin into the fiber layer. Then the temperature is raised to 350° F. for about 2 hours to fully cure the resin. The mold is cooled and the product is removed. A well bonded assembly results, with a uniform, substantially void free, fiber reinforced surface.

We claim:

1. The method of making a light weight, high strength composite structure which comprises the steps of:
   providing a closed-cell foam core having a selected configuration;
   compressing said core to a smaller, shape retaining, selected configuration;
   impregnating a sheet of flexible open-cell foam with a liquid thermosetting resin;
   placing a sheet of dry fiber material on at least one surface of said foam sheet;
   wrapping the assembled sheets around said core;
   placing the resulting assembly in a closed mold; and
   heating said mold to initially expand said core and then cure said thermosetting resin;
   whereby said core expands and forces sufficient liquid resin out of said foam sheet to fully impregnate said fiber sheet, prior to cure of the thermosetting resin.

2. The method according to claim 1 wherein said core is compressed to about 75 to 95% of the original volume.

3. The method according to claim 1 wherein said core is compressed to about 75 to 80% of the original volume.

4. The method according to claim 1 wherein said foam sheet is formed from a polyurethane resin.

5. The method according to claim 1 wherein said foam sheet has a thickness of from about 0.125 and 1.0 inch.

6. The method according to claim 1 wherein said sheet of dry fiber material comprises a plurality of fiber fabric layers comprising fibers selected from the group consisting of glass, graphite, boron, aramid and mixtures thereof.

7. The method according to claim 1 wherein said foam core and product have an airfoil configuration.

8. The method of making a light weight, high strength composite structure which comprises the steps of:
   providing a closed-cell foam core having a selected configuration;
   compressing said core to a a selected, shape retaining, configuration having a volume of about 70 to 95% of the original core volume;
   impregnating an about 0.125 to 1.0 inch thick sheet of open-cell polyurethane foam with a liquid epoxy resin precursor;
   placing a multi-layer sheet of dry fiber material on at least one surface of said foam sheet;
   wrapping said assembled sheets around said core;
   placing the resulting assembly in a closed, tight-fitting, mold; and
   heating said mold to initially expand said core and then cure said epoxy resin;
   whereby said core expands and forces sufficient liquid resin out of said foam sheet into said fiber sheet to fully impregnate said fiber sheet prior to cure of said thermosetting resin.

9. A light weight, high strength composite structure made by the method of claim 8.

* * * * *